(12) United States Patent
Usuda et al.

(10) Patent No.: US 7,218,617 B1
(45) Date of Patent: May 15, 2007

(54) TRANSMISSION METHOD OF DOWNLINK PILOT CHANNEL IN CDMA MOBILE COMMUNICATION SYSTEM, AND CDMA MOBILE COMMUNICATION SYSTEM

(75) Inventors: Masafumi Usuda, Kanagawa (JP);
Yoshihiro Ishikawa, Kanagawa (JP)

(73) Assignee: NTT DoCoMo, Inc., Chiyoda-ku, Tokyo (JP)

( * ) Notice: Subject to any disclaimer, the term of this patent is extended or adjusted under 35 U.S.C. 154(b) by 430 days.

(21) Appl. No.: 09/693,377

(22) Filed: Oct. 20, 2000

(30) Foreign Application Priority Data

Oct. 22, 1999 (JP) ................................. 11-301710

(51) Int. Cl.
*H04B 7/216* (2006.01)
*H04J 11/00* (2006.01)

(52) U.S. Cl. ....................... 370/320; 370/208; 370/209; 375/130

(58) Field of Classification Search ................ 370/208, 370/209, 310, 310.2, 320, 335, 342; 375/235, 375/130

See application file for complete search history.

(56) References Cited

U.S. PATENT DOCUMENTS

| | | | | |
|---|---|---|---|---|
| 5,930,230 | A * | 7/1999 | Odenwalder et al. | 370/208 |
| 6,061,338 | A | 5/2000 | O | 370/335 |
| 6,073,021 | A * | 6/2000 | Kumar et al. | 455/442 |
| 6,094,450 | A * | 7/2000 | Shockey | 375/141 |
| 6,097,954 | A * | 8/2000 | Kumar et al. | 455/442 |
| 6,285,655 | B1 * | 9/2001 | Lundby et al. | 370/209 |
| RE37,420 | E * | 10/2001 | Asano et al. | 375/144 |
| 6,577,608 | B1 * | 6/2003 | Moon et al. | 370/311 |

FOREIGN PATENT DOCUMENTS

| | | |
|---|---|---|
| EP | 0 795 969 | 9/1997 |
| EP | 0 851 601 | 7/1998 |
| EP | 0 884 918 A2 | 12/1998 |

(Continued)

OTHER PUBLICATIONS

Usuda et al., "Optimizing the Number of Dedicated Pilot Symbols for Forward Link in W-CDMA Systems", 51st IEEE Vehicular Technology Conference (VTC 2000-Spring), pp. 2118-2122, May 2000.

(Continued)

*Primary Examiner*—Doris H. To
*Assistant Examiner*—Saba Tsegaye
(74) *Attorney, Agent, or Firm*—Workman Nydegger

(57) ABSTRACT

A pilot channel transmission method is provided of transmitting a pilot channel through a downlink from a base station in a CDMA mobile communication system including base stations. Each base station is installed in one of a plurality of cells, uses a same frequency, and divides its channels using orthogonal codes uniquely assigned to the channels. Each of the cells is identified by multiplying a spreading code assigned to each base station by the channels spread by the orthogonal codes. In the pilot channel transmission method, when a plurality of orthogonal code sets, each of which includes a plurality of spreading codes assigned thereto, using by each base station, a pilot channel is assigned to each orthogonal code set, and at least one of the pilot channels is transmitted. The pilot channel can be provided with a symbol rate higher than the minimum symbol rate defined in the system.

12 Claims, 12 Drawing Sheets

FOREIGN PATENT DOCUMENTS

| | | |
|---|---|---|
| JP | 1198550 | 8/1989 |
| JP | 9238098 | 9/1997 |
| JP | 9252266 | 9/1997 |
| JP | 9261763 | 10/1997 |
| JP | 10145839 | 5/1998 |
| JP | 11252002 | 9/1999 |
| JP | 2000031939 | 1/2000 |
| JP | 2001008262 | 1/2001 |
| JP | 2001053720 | 2/2001 |
| JP | 2002-507855 | 3/2002 |
| WO | WO 97/29596 | 8/1997 |
| WO | WO99/48228 | 9/1999 |

OTHER PUBLICATIONS

Ericsson, "Proposal for downlink interference measurement method revised", 3GPP ($3_{rd}$ Generation Partnership Project) TSG-RAN Working Group 1 meeting #5, TSGR1#5(99)644, Jun. 1999.

Official Notice of Rejection Patent Application No.: 11-301710 Case No.: DCMH110154.

* cited by examiner

TRANSMISSION METHOD OF DOWNLINK PILOT CHANNEL IN CDMA MOBILE COMMUNICATION SYSTEM, AND CDMA MOBILE COMMUNICATION SYSTEM

This application claims the priority of Patent Application No. 11-301710 (1999) filed Oct. 22, 1999 in Japan, the content of which is incorporated hereinto by reference.

BACKGROUND OF THE INVENTION

1. Field of the Invention

The present invention relates to a CDMA (Code Division Multiple Access) transmission method of downlink pilot channel in a CDMA mobile communication system, a CDMA mobile communication system, a base station and a mobile station.

2. Description of Related Art

FIG. 1 is a schematic diagram illustrating a spreading code arrangement in a CDMA mobile communication system.

As illustrated in FIG. 1, cell division is usually implemented by spreading codes with a long period (called "scrambling codes" from now on) that are uniquely assigned to cells each, and channel division is implemented by spreading codes with a short period (called "channelization codes" from now on) that are uniquely assigned to channels in the cells each.

Although the channelization codes usually consist of codes orthogonal to each other, the number of such codes is limited, and hence, a shortage of the channelization codes can take place. In such a case, that is, when a set of orthogonal codes is exhausted, a new channelization code set is generated by assigning a plurality of scrambling codes to each cell. This will be described with reference to FIG. 1. In cell #1, although the channelization code set #1 corresponding to channels CH#1+#N employs a scrambling code SCCODE #1, the channels CH#N+1 and onward use a scrambling code SCCODE #2 to create a new channelization code set #2.

Next, referring to FIGS. 2 and 3, an arrangement of downlink pilot channels and an example of transmission power of each channel in a conventional technique will be outlined.

FIG. 2 is a diagram illustrating an arrangement of the downlink pilot channels on the conventional technique. In FIG. 2, the height of each channel schematically represents the symbol rate of the channel, which means that a thicker channel has a higher symbol rate. The CDMA mobile communication system carries out orthogonalization by spreading data symbols of various channels using the channelization codes to transmit these channels at the same transmission rate. Here, the same transmission rate after the spreading is referred to as "chip rate", and the transmission rate of the data symbols before the spreading is referred to as "symbol rate". Generally, a system with a chip rate of N chips/second can contain the orthogonal code set of the cells in a single sequence if the total symbol rate of the channels is equal to or less than N.

The downlink pilot channel CH#1 is provided for the purpose of obtaining phase information used for demodulating the downlink traffic channels, detecting a received path, and obtaining interference power for traffic channels to carry out the transmission power control. The pilot channel has the minimum symbol rate provided by the system (the CH 1 is denoted as a thinnest channel in FIG. 2) because it either undergoes data modulation by a known pattern or does not undergo any data modulation at all.

FIG. 3 is a diagram illustrating transmission powers of downlink channels in the conventional technique. In FIG. 3, the height of each channel schematically denotes the transmission power of the channel. Thus, a higher channel has higher transmission power. Since the pilot channel CH#1 is utilized for the purposes mentioned above, it is usually transmitted at the transmission power higher than the transmission power of the other traffic channels as illustrated in FIG. 3.

To achieve interference power measurement for the transmission power control at high accuracy, it is necessary to generate many samples of a signal used for the measurement. However, since the conventional pilot channel is provided with the minimum symbol rate of the system, it is impossible to obtain sufficient samples, presenting a problem of hindering high measuring accuracy.

In addition, when using a plurality of orthogonal code sets in the downlink, although the channels belonging to the same orthogonal code set do not interfere with one another on the same received paths, they can interfere on the other paths. On the other hand, channels belonging to different orthogonal code sets can interfere to each other regardless of whether on the same paths or the other paths. Accordingly, the interference power received by the traffic channels differ depending on the orthogonal code sets to which the traffic channels belong. However, since the pilot channel is provided for only one orthogonal code set as illustrated in FIG. 2, there arises a problem in that the channels in the other orthogonal code sets prevent accurate interference power measurement for the transmission power control.

Moreover, since the pilot channel is an overhead channel without transmitting any information, transmitting it beyond necessary transmission power will bear upon the other channels, presenting a problem of reducing channel capacity. On the other hand, the interference power measurement can be achieved even if the transmission power is zero by measuring the variance of the channel, and when using the pilot channel for the purposes other than the interference power measurement, it usually does not matter whether it belongs to the same orthogonal code set or not.

SUMMARY OF THE INVENTION

The present invention is implemented to solve the foregoing problems. It is therefore an object of the present invention to provide a transmission method of downlink pilot channels in a CDMA mobile communication system, a CDMA mobile communication system, a base station and a mobile station capable of increasing the total capacity of the system by increasing the accuracy of the transmission power control by increasing the number of symbols measurable in a predetermined time period in the interference measurement by providing the pilot channel with a symbol rate higher than the minimum symbol rate of the system.

Another object of the present invention is to provide a transmission method of downlink pilot channels in a CDMA mobile communication system, a CDMA mobile communication system, a base station and a mobile station that can implement the interference power measurement using a pilot channel belonging to the same orthogonal code set as the channel conducting communication by providing each orthogonal code set with a pilot channel, and that can increase the total capacity of the system by increasing the accuracy of the transmission power control.

Still another object of the present invention is to provide a transmission method of downlink pilot channels in a CDMA mobile communication system, a CDMA mobile communication system, a base station and a mobile station capable of increasing the total capacity of the system by restraining the total downlink transmission power by turning off the transmission of the pilot channels in the second and subsequent orthogonal code sets (without actually transmitting the channels although they are reserved).

According to a first aspect of the present invention, there is provided a pilot channel transmission method of transmitting a pilot channel through a downlink from a base station in a CDMA mobile communication system including base stations, wherein each base station is installed in one of a plurality of cells, uses a same frequency, and divides its channels using orthogonal codes uniquely assigned to the channels, and each of the cells is identified by multiplying a spreading code assigned to each base station by the channels spread by the orthogonal codes, the pilot channel transmission method comprising the step of:

assigning, when providing each of the base stations with a plurality of orthogonal code sets to which a plurality of spreading codes are assigned, pilot channels to each of the plurality of orthogonal code sets, and transmitting at least one of the pilot channels.

According to the first aspect, when a mobile station conducts the interference measurement with the channel carrying out the transmission power control, it can achieve the interference power measurement using the pilot channel belonging to the same orthogonal code set as that channel, making possible to improve the accuracy of the transmission power control.

According to a second aspect of the present invention, there is provided a pilot channel transmission method of transmitting pilot channels through a downlink from a base station in a CDMA mobile communication system including base stations, wherein each base station is installed in one of a plurality of cells, uses a same frequency, and divides its channels using orthogonal codes uniquely assigned to the channels, and each of the cells is identified by multiplying a spreading code assigned to each base station by the channels spread by the orthogonal codes, the pilot channel transmission method comprising the step of:

providing the pilot channels with a symbol rate higher than a minimum symbol rate defined in the CDMA mobile communication system.

According to a third aspect of the present invention, the symbol rate higher than the minimum symbol rate may be determined in accordance with a relationship between transmission power of each channel and channel capacity.

According to the second or third aspect, improving the accuracy of the interference measurement by increasing the symbol rate of the pilot channels brings about the improvement in the accuracy of the transmission power control, resulting in an increase in the system capacity.

According to a fourth aspect of the present invention, the pilot channels assigned to second and subsequent orthogonal code sets may be not transmitted.

According to the fourth aspect, only one of the pilot channels which are assigned to the plurality of orthogonal code sets is transmitted without transmitting the other pilot channels just with reserving the codes, which enables the system to avoid transmitting excess power for interference power measurement, making possible to increase the channel capacity.

According to a fifth aspect of the present invention, there is provided a base station in a CDMA mobile communication system including base stations, wherein each base station is installed in one of a plurality of cells, uses a same frequency, and divides its channels using orthogonal codes uniquely assigned to the channels, and each of the cells is identified by multiplying a spreading code assigned to each base station by the channels spread by the orthogonal codes, the base station comprising:

a transmitter for assigning, when providing each of the base stations with a plurality of orthogonal code sets to which a plurality of spreading codes are assigned, pilot channels to each of the plurality of orthogonal code sets, and for transmitting at least one of the pilot channels.

According to the fifth aspect, when the mobile station conducts the interference measurement with the channel carrying out the transmission power control, it can achieve the interference power measurement using the pilot channel belonging to the same orthogonal code set as that channel, making possible to improve the accuracy of the transmission power control.

According to a sixth aspect of the present invention, there is provided a base station in a CDMA mobile communication system including base stations, wherein each base station is installed in one of a plurality of cells, uses a same frequency, and divides its channels using orthogonal codes uniquely assigned to the channels, and each of the cells is identified by multiplying a spreading code assigned to each base station by the channels spread by the orthogonal codes, the base station comprising:

a transmitter for providing pilot channels with a symbol rate higher than a minimum symbol rate defined in the CDMA mobile communication system, and for transmitting the pilot channel.

According to a seventh aspect of the present invention, the symbol rate higher than the minimum symbol rate may be determined in accordance with a relationship between transmission power of each channel and channel capacity.

According to the sixth or seventh aspect, improving the accuracy of the interference measurement by increasing the symbol rate of the pilot channels brings about the improvement in the accuracy of the transmission power control, resulting in an increase in the system capacity.

According to an eighth aspect of the present invention, the pilot channels assigned to second and subsequent orthogonal code sets may be not transmitted.

According to the eighth aspect, only one of the pilot channels which are assigned to the plurality of orthogonal code sets is transmitted without transmitting the other pilot channels just with reserving the codes, which enables the system to avoid transmitting excess power for interference power measurement, making possible to increase the channel capacity.

According to a ninth aspect of the present invention, there is provided a CDMA mobile communication system comprising the base station.

According to a tenth aspect of the present invention, there is provided a mobile station carrying out radio communication with the base station while carrying out transmission power control, the mobile station comprising:

a measuring section for performing, using the pilot channel received from the base station, interference measurement of a traffic channel belonging to a same orthogonal code set that the pilot channel belongs to.

According to an eleventh aspect of the present invention, there is provided a mobile station carrying out radio communication with the base station while carrying out transmission power control, the mobile station comprising:

a measuring section for performing interference measurement using a symbol period of the pilot channel received from the base station.

The above and other objects, features and advantages of the present invention will become more apparent from the following description of embodiments thereof taken in conjunction with the accompanying drawings.

DETAILED DESCRIPTION OF THE PREFERRED EMBODIMENTS

The invention will now be described with reference to the accompanying drawings.

Embodiment 1

Figure 1:
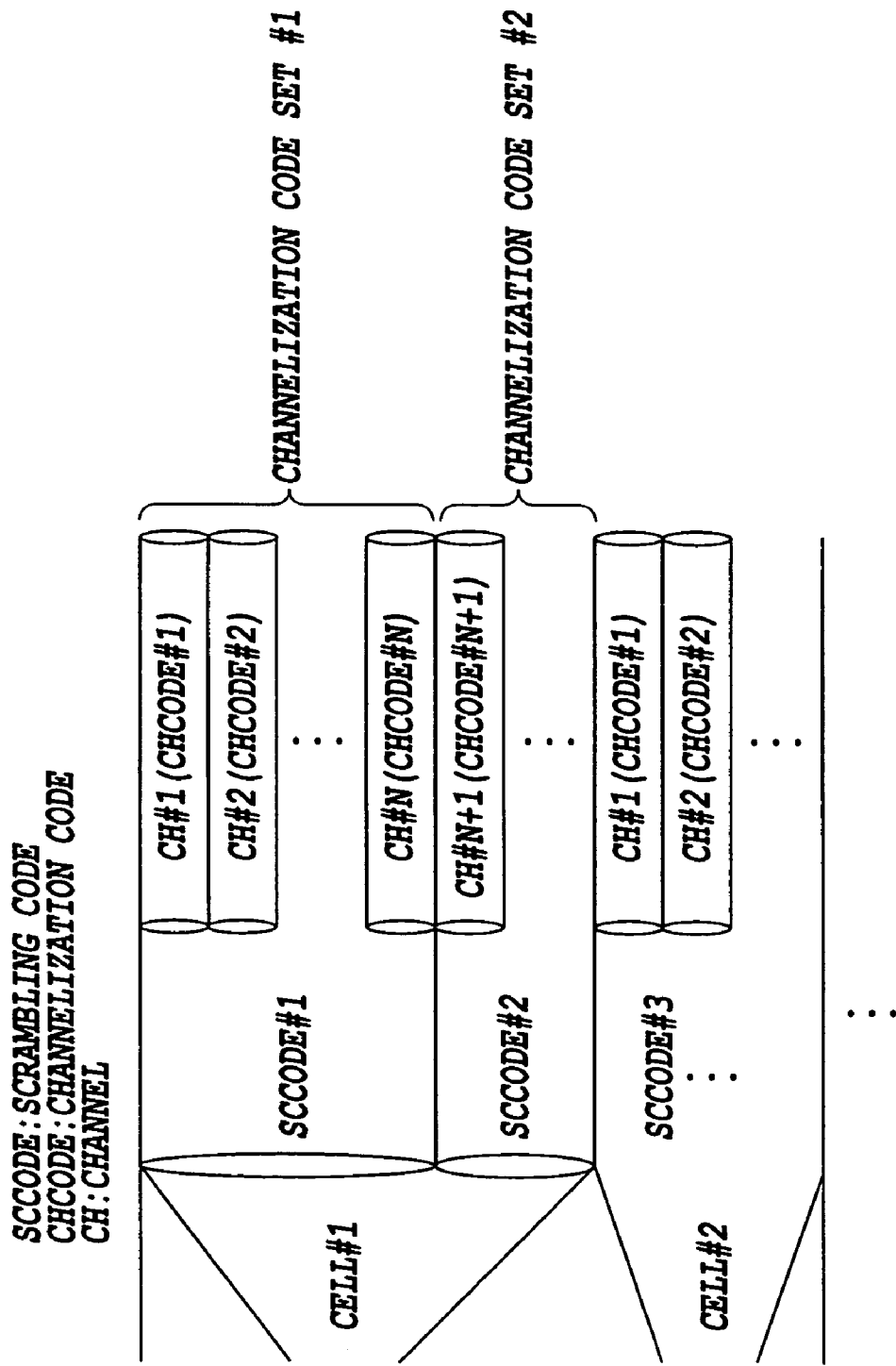
FIG. 1 is a diagram illustrating a spreading code arrangement in a CDMA mobile communication system.
Figure 2:
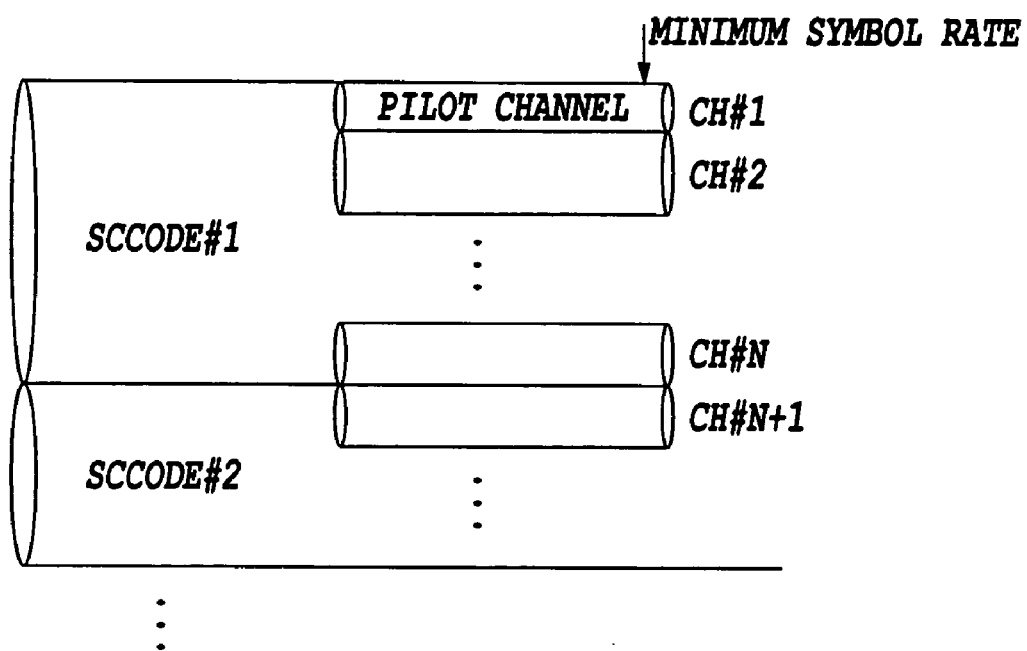
FIG. 2 is a diagram illustrating an arrangement of downlink pilot channels in a conventional technique.
Figure 3:
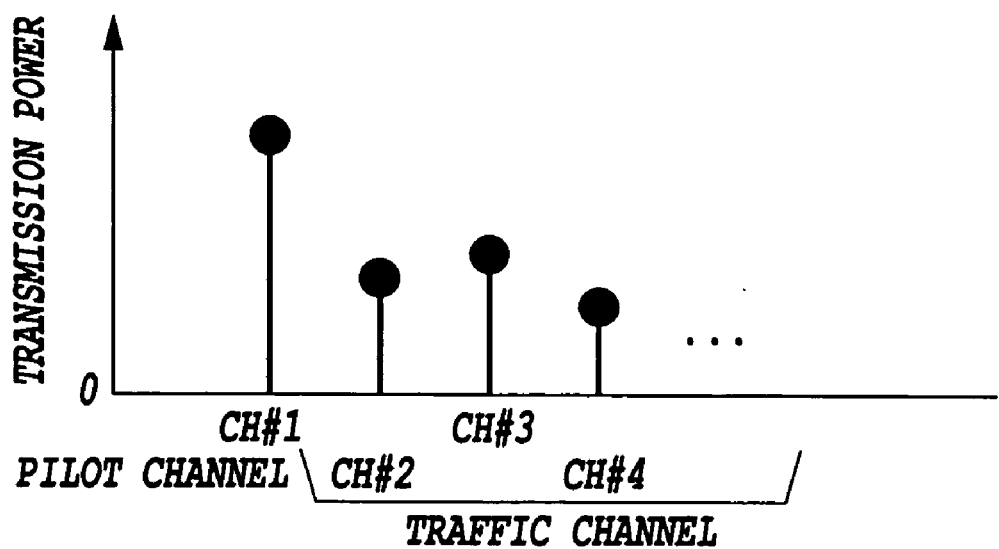
FIG. 3 is a diagram illustrating transmission powers of the downlink pilot channels in the conventional technique.
Figure 4:
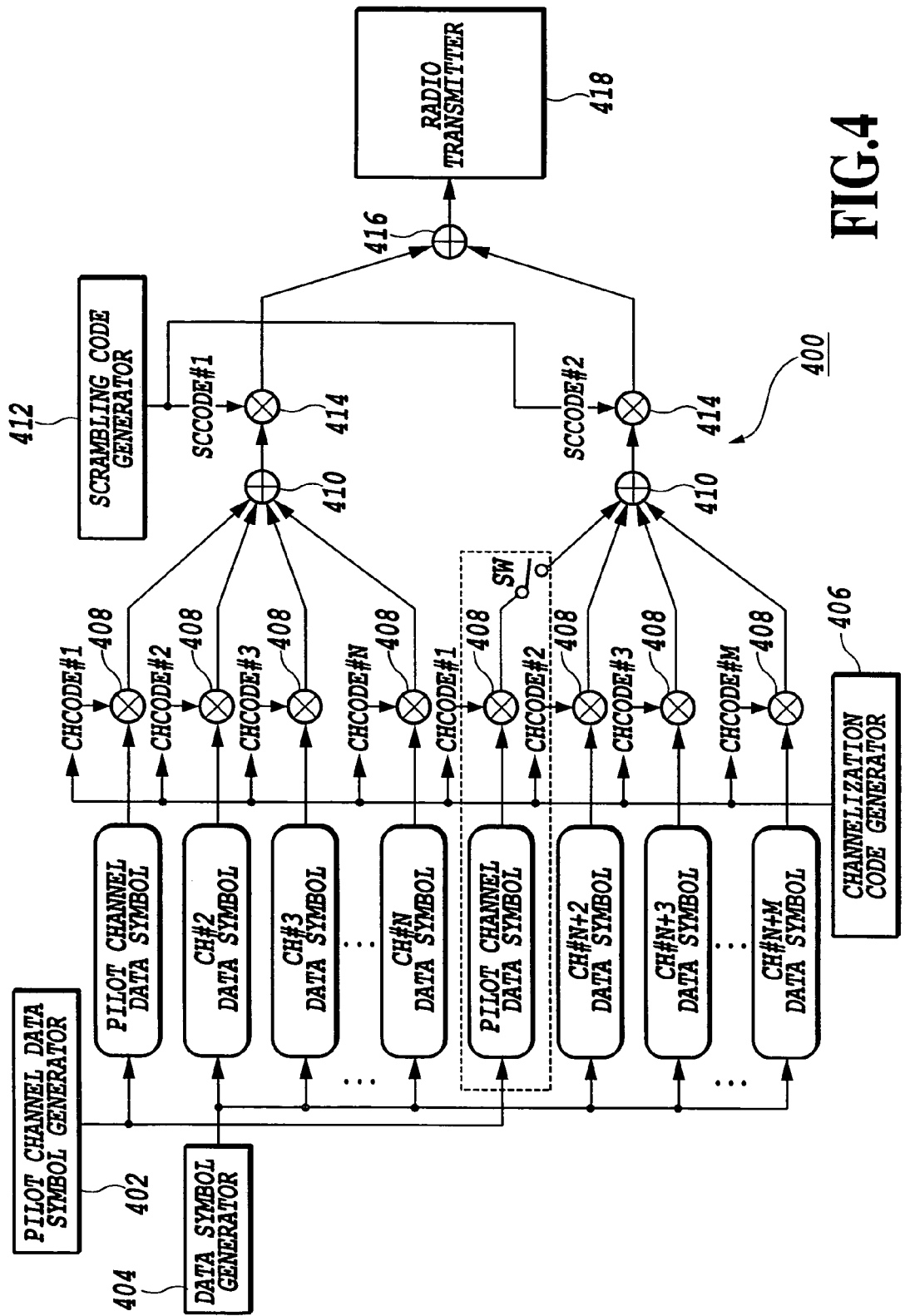
FIG. 4 is a block diagram showing a configuration of a base station in accordance with the present invention.

FIG. 4 is a block diagram showing a configuration of a base station in accordance with the present invention, in which only part of the base station relevant to the present invention is outlined. Although FIG. 4 illustrates a case including only two scrambling codes, the present invention is not limited to it, and any number of scrambling codes can be employed in the present invention.

The base station 400 comprises at least a pilot channel data symbol generator 402, a data symbol generator 404, a channelization code generator 406, first multipliers 408, first adders 410, a scrambling code generator 412, second multipliers 414, a second adder 416 and a radio transmitter 418.

The pilot channel data symbol generator 402 produces data symbols for the pilot channels, and the data symbol generator 404 produces data symbols for the channels other than the pilot channels. The pilot channel data symbol generator 402 generates its symbol patterns, and the data symbol generator 404 carries out the error correcting coding and framing processing of the data symbols in accordance with channel specifications, and determines the symbol rate.

The channelization code generator 406 produces for each channel in the cell a channelization code, that is, a short period spreading code uniquely assigned to the channel. The channelization codes are usually orthogonal to each other. The channelization code generator 406 generates a new channelization code set corresponding to each scrambling code.

The first multipliers 408 each multiply a data symbol sequence, which is generated by the pilot channel data symbol generator 402 or by the data symbol generator 404, by the corresponding channelization code.

The first adders 410 each sum up to combine the data symbol sequences output from the first multipliers 408 for each channelization code set.

The scrambling code generator 412 produces a scrambling code, that is, a long period spreading code uniquely assigned to each cell. Although a plurality of scrambling codes can be assigned to each cell, the second and the subsequent scrambling codes can differ from the first scrambling code, for example, in generator polynomials, or in the phases although the generator polynomial is identical (that is, different only in initial values of s shift register).

The second multipliers 414 multiply the signals output from the first adders 410 by the scrambling codes.

The second adder 416 sums up the channelization code sets.

The radio transmitter 418 transmits the signal combined by the second adder 416 to a mobile station. The mobile station carries out the transmission power control in response to the signal transmitted from the base station 400.

The transmission of the data symbols associated with the second and the subsequent pilot channels are suppressed by the control of a switch SW (see, the block denoted by broken lines in FIG. 4) when the transmission of these pilot channels are turned off, although the channelization codes of these pilot channels are reserved.

Next, referring to FIGS. 5–9, a pilot channel transmission method of the base station in accordance with the present invention will be described in detail.

First Embodiment

Figure 5:
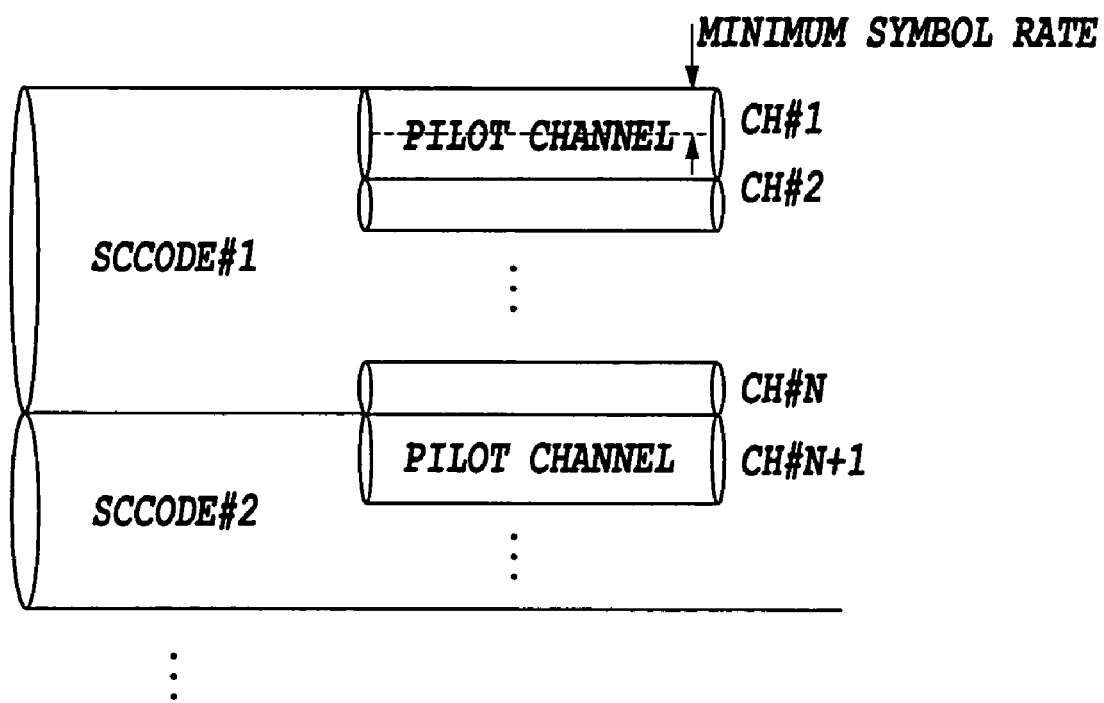
FIG. 5 is a diagram illustrating an arrangement of pilot channels in a first embodiment in accordance with the present invention.
Figure 9:
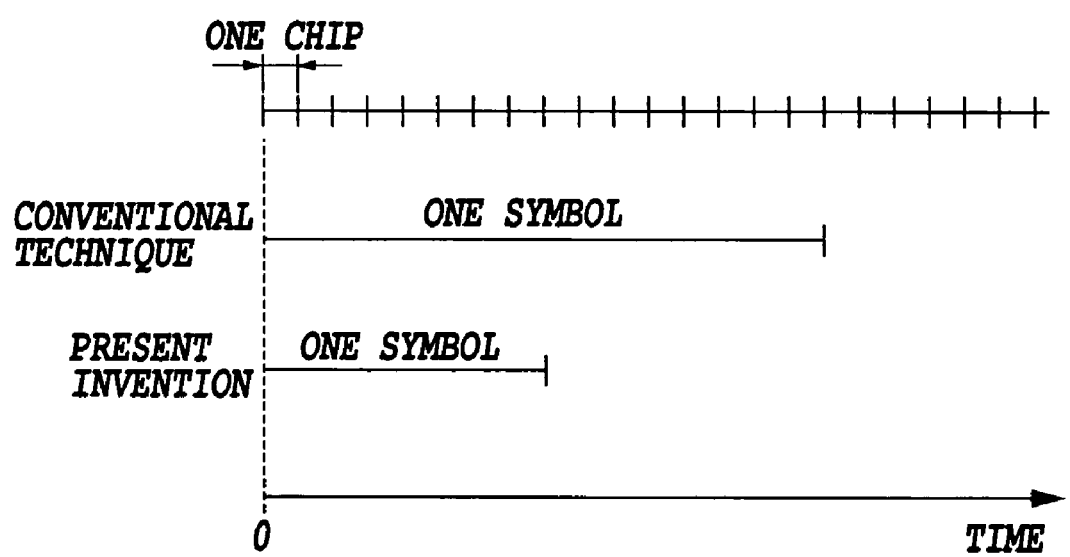
FIG. 9 is a diagram schematically illustrating an example of symbol rates in the present invention.

FIG. 5 is a schematic diagram illustrating an arrangement of the pilot channels in the first embodiment in accordance with the present invention. In FIG. 5, the height of each channel schematically denotes the symbol rate of that channel, and hence a thicker channel has a higher symbol rate. The pilot channels CH#1 and CH#N+1 are assigned a symbol rate higher than the minimum symbol rate. As schematically illustrated in FIG. 9, the symbol rate can be increased by reducing the symbol period, that is, by reducing the number of chips per symbol with maintaining the chip rate, that is, the spread bandwidth. An optimum symbol rate of the pilot channels can be determined by a method as illustrated in FIG. 7.

Figure 7:
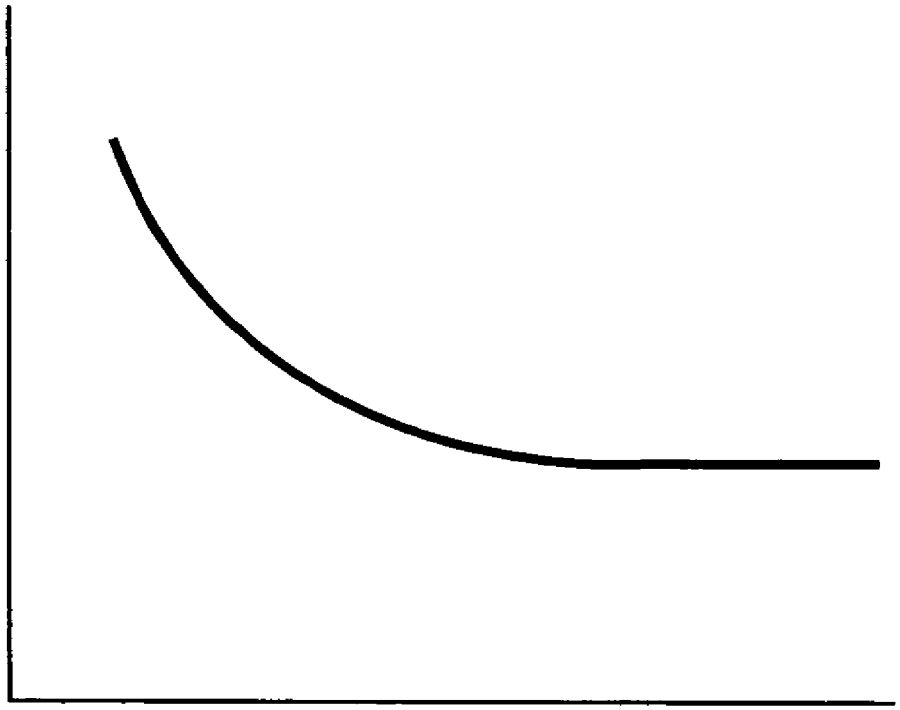
FIG. 7 is a graph illustrating relationships between the symbol rate of a pilot channel and the transmission power required for a traffic channel to carry out transmission power control.

FIG. 7 is a graph illustrating relationships between the symbol rate of the pilot channel and the transmission power required for the traffic channel carrying out the transmission power control.

As described before, as the symbol rate of the pilot channel increases, the accuracy of the interference power measurement is improved, and hence highly accurate transmission power control is implemented, reducing the transmission power of the traffic channels. However, since the sum total of the symbol rates assignable to the traffic channels is reduced by increasing the symbol rate of the pilot channels, it is likely that the channel capacity is reduced. Thus, the pilot channels are provided with a symbol rate that will optimize the relationships between the two types of the channels in terms of the capacity.

Figure 6:
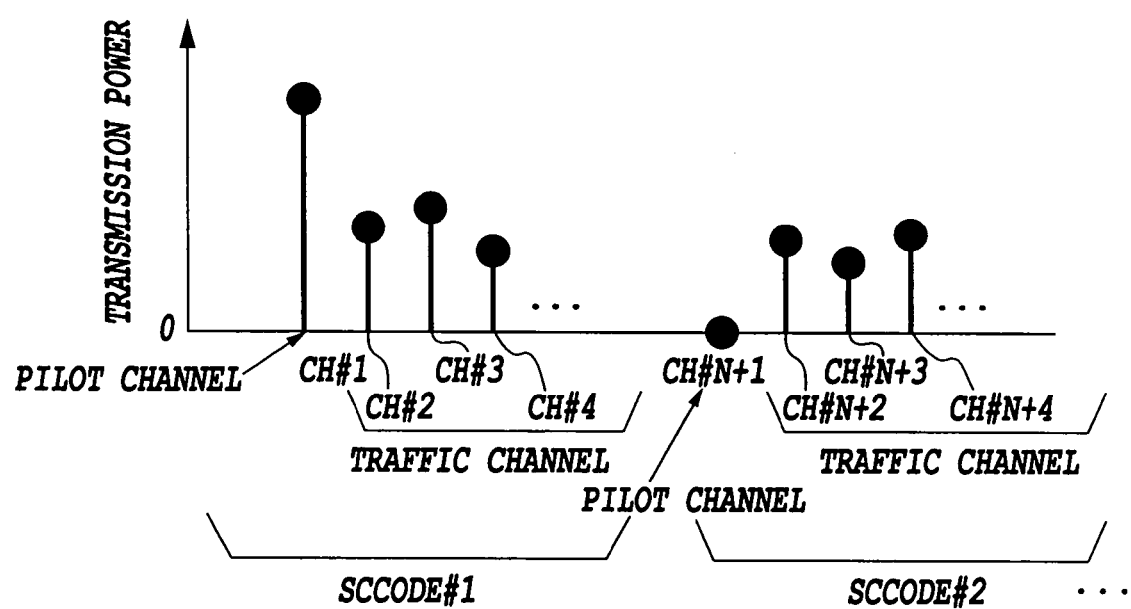
FIG. 6 is a diagram illustrating an example of transmission powers of pilot channels and traffic channels in the first embodiment in accordance with the present invention.

FIG. 6 is a schematic diagram illustrating an example of transmission powers of pilot channels and traffic channels in the first embodiment in accordance with the present invention. In FIG. 6, the height of each channel schematically denotes the transmission power of the channel: a higher channel has higher transmission power. Here, the pilot channels CH#1 and CH#N+1 are provided for respective scrambling codes, and except for the only one pilot channel CH#1, the transmission of the second and subsequent pilot channel(s) CH#N+1 is turned off.

As described above, assigning the pilot channel to each scrambling code makes possible to implement the interference measurement considering the orthogonalization of the channelization codes.

In addition, placing the symbol rate of the pilot channel at a rate higher than the minimum symbol rate defined by the system can increase the number of samples of the interference measurement, thereby improving the interference measuring accuracy. The accurate interference measurement can implement accurate transmission power control, increasing the channel capacity. Besides, turning off the transmission of the remaining pilot channels except for one pilot channel can prevent an increase in the interference to other channels and cells.

Second Embodiment

Figure 8:
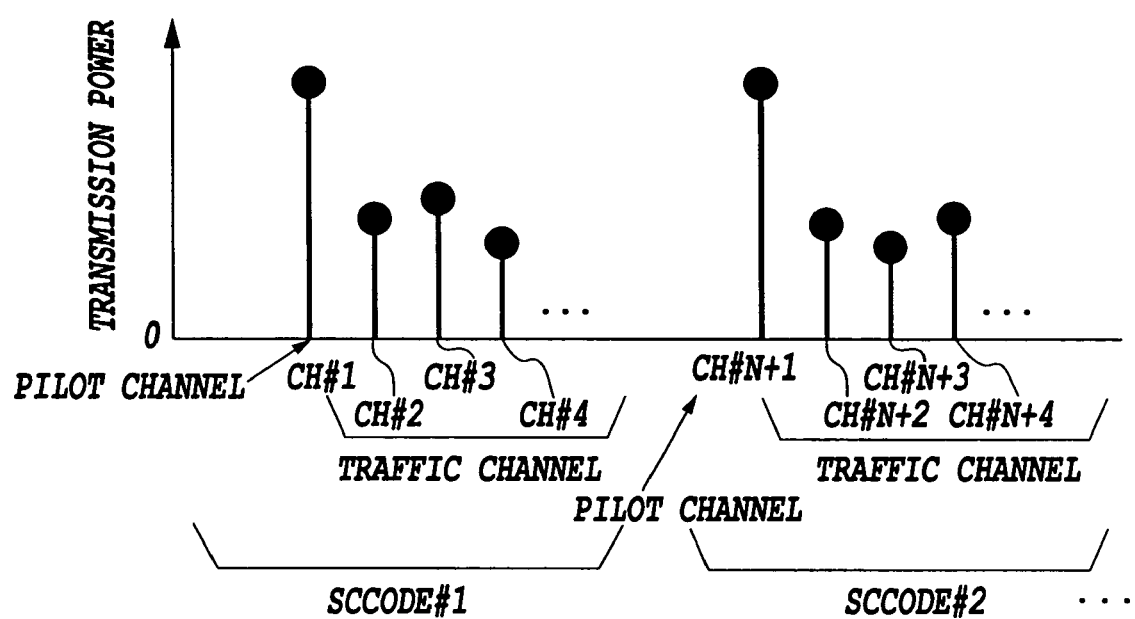
FIG. 8 is a diagram illustrating an example of transmission powers of pilot channels and traffic channels in a second embodiment in accordance with the present invention.

FIG. 8 is a diagram illustrating an example of transmission powers of pilot channels and traffic channels in a second embodiment in accordance with the present invention.

Here, the channel arrangement of the pilot channels and traffic channels are assumed to be the same as that of the first embodiment.

As illustrated in FIG. 8, in the present embodiment, each pilot channel assigned to the scrambling code is transmitted at prescribed power.

As described above, transmitting the pilot channels allotted to the scrambling codes enables the interference measurement, path detection and channel estimation using each pilot channel in the same scrambling code, thereby preventing an increase in the hardware of the mobile station.

Other Embodiments

Although the foregoing embodiments are described by taking an example of increasing the symbol rate of the pilot channels, the present invention is not limited to those embodiments. For example, it can be applied to a case where the symbol rate of the pilot channels is not increased.

Figure 10:
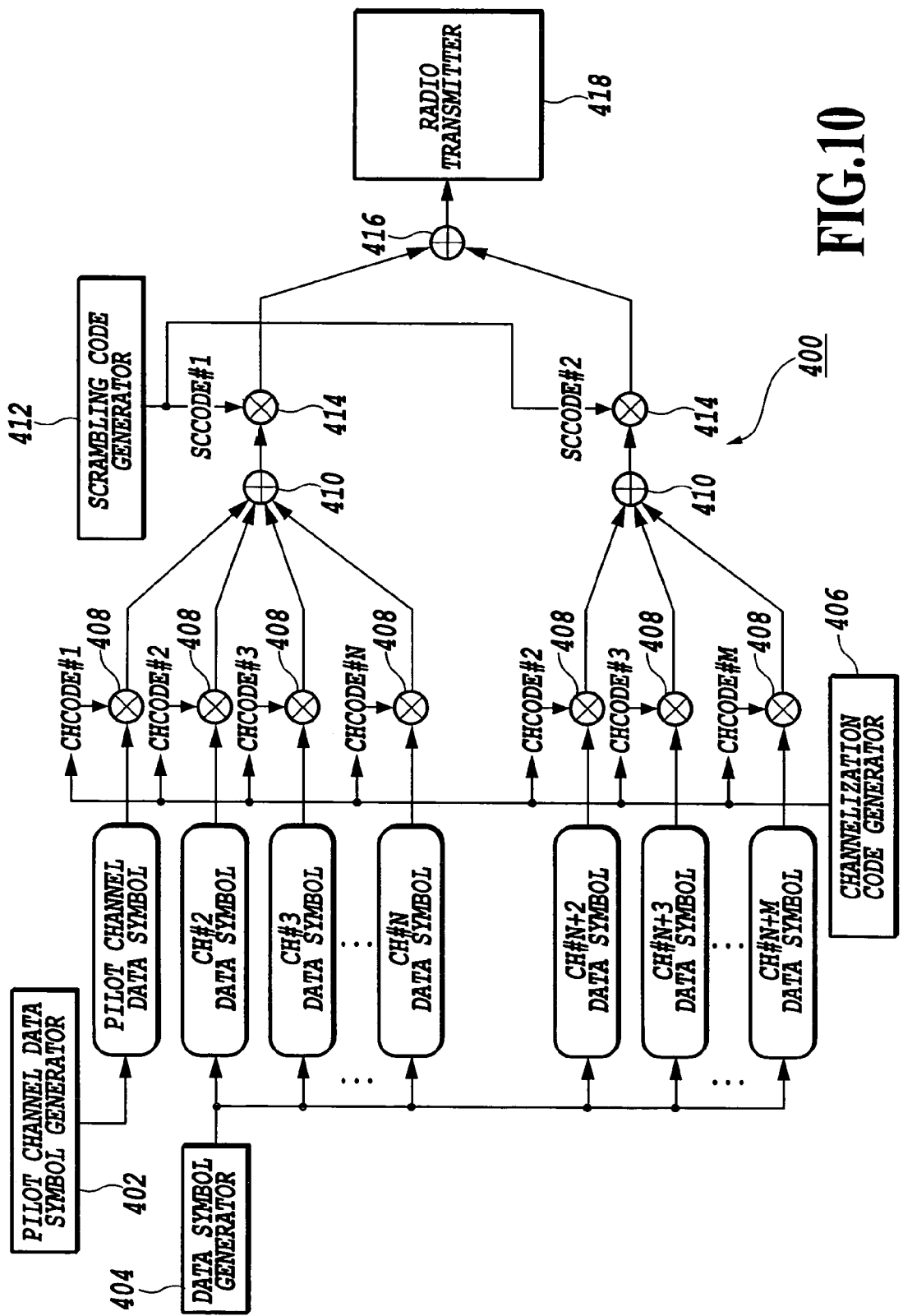
FIG. 10 is a block diagram showing a configuration of a base station in accordance with the present invention.

In addition, although the foregoing embodiments are described by taking an example of suppressing, when the transmission of the second and the subsequent pilot channels is turned off as described in connection with the block indicated by dashed lines in FIG. 4, the transmission of these channels by the switch SW with reserving the channelization codes for the pilot channels, the present invention is not limited to those embodiments. For example, as shown in FIG. 10, the pilot channel data symbol generator 402 is also applicable to a case where no data symbols are generated for the second and the subsequent pilot channels. Since the same reference numerals designate the corresponding portions with the same functions in FIGS. 4 and 10, the description thereof is omitted here.

(Configuration of Mobile Station)

A configuration of the mobile station used in the foregoing embodiments in accordance with the present invention will now be described referring to FIGS. 11 and 12.

Figure 11:
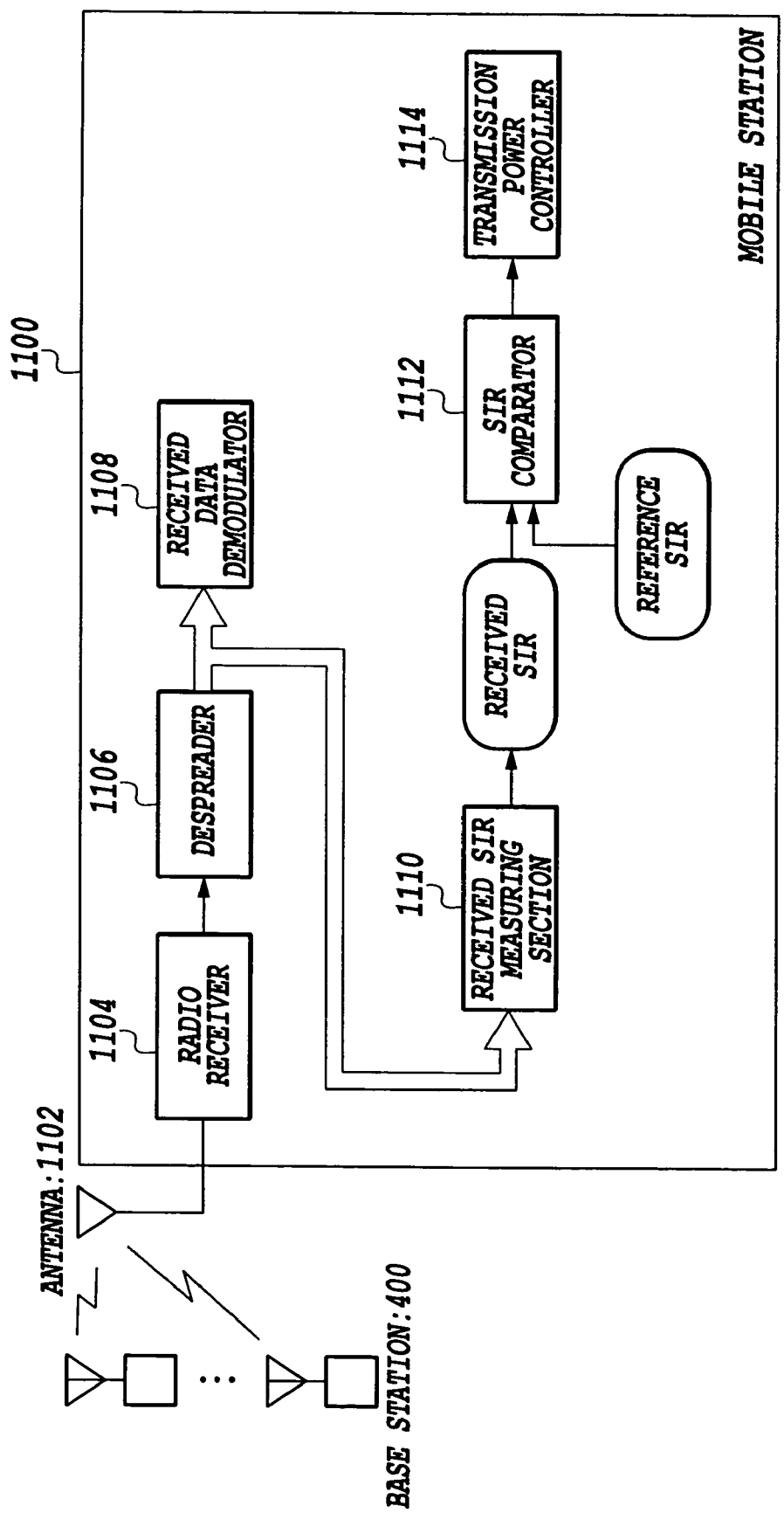
FIG. 11 is a block diagram showing a configuration of a mobile station in accordance with the present invention.

FIG. 11 is a block diagram showing a configuration of a mobile station in accordance with the present invention, in which only portions of the mobile station relevant to the present invention is shown.

The mobile station 1100 comprises at least an antenna 1102, a radio receiver 1104, a despreader 1106, a received data demodulator 1108, a received SIR measuring section 1110, an SIR comparator 1112 and a transmission power controller 1114, and has a function to conduct radio communications with a plurality of base station 400 while carrying out transmission power control. The antenna 1102 is connected to the radio receiver 1104, and receives radio waves transmitted from a base station 400. The radio receiver 1104 is connected between the antenna 1102 and the despreader 1106, and receives a signal from the base station 400 via the antenna 1102. The despreader 1106, which is connected with the radio receiver 1104, the received data demodulator 1108 and the received SIR measuring section 1110, despreads the signal received by the radio receiver 1104, and supplies its output to the received data demodulator 1108 and the received SIR measuring section 1110. Thick arrows in FIG. 11 indicates that they include a plurality of despread sequences. The received data demodulator 1108 is connected to the despreader 1106, and demodulates the received signal despread by the despreader 1106. The received SIR measuring section 1110 is connected between the despreader 1106 and the SIR comparator 1112, and measures the received SIR which will be described later in connection with FIG. 12. The SIR comparator 1112 is connected between the received SIR measuring section 1110 and transmission power controller 1114, and compares the received SIR measured by the received SIR measuring section 1110 with a reference SIR. The reference SIR can be stored in advance in a memory in the mobile station 1100. The transmission power controller 1114 is connected to the SIR comparator 1112, and carries out the transmission power control such as deciding the transmission power control bit in response to the compared result by the SIR comparator 1112.

Figure 12:
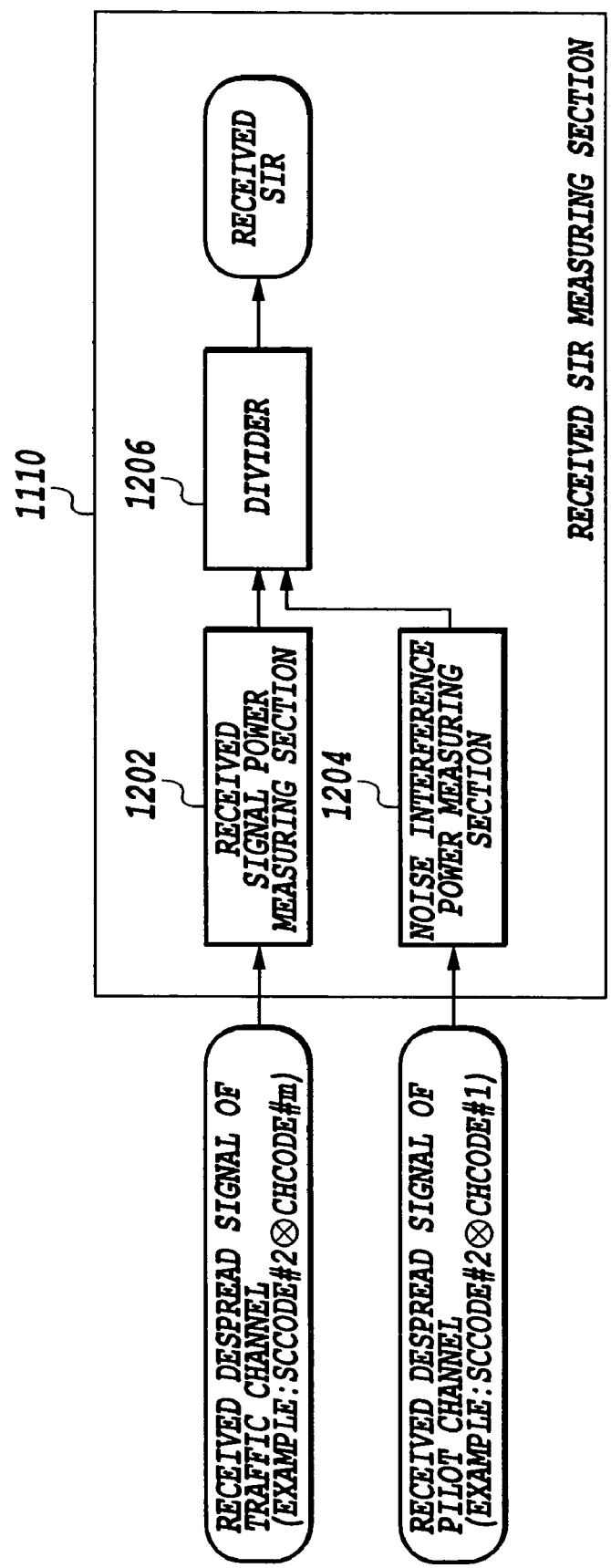
FIG. 12 is a block diagram showing a configuration of a received SIR measuring section in the mobile station in accordance with the present invention.

FIG. 12 is a block diagram showing a configuration of the received SIR measuring section 1110 of FIG. 11.

The received SIR measuring section 1110 comprises at least a received signal power measuring section 1202, a noise interference power measuring section 1204 and a divider 1206. The received signal power measuring section 1202 receives a received despread signal of a traffic channel despread by the despreader 1106, and measure the power A of the received signal. The noise interference power measuring section 1204 connected to the divider 1206 receives a received despread signal of a pilot channel despread by the despreader 1106 and measures its power to obtain the noise interference power B. The divider 1206, which is connected to the received signal power measuring section 1202 and the noise interference power measuring section 1204, divides the power A of the received signal by the noise interference power B to determine the received SIR.

Next, an operation of the mobile station thus configured in accordance with present invention will be described.

The mobile station can conduct the transmission power control by one of the following two methods: First, when the base station transmits the pilot channels each assigned to one of the channelization code sets, the mobile station has the received SIR measuring section 1110 measure the interference power using the pilot channel in each scrambling code, thereby carrying out the transmission power control; and second, when the base station does not transmit the pilot channels, the mobile station measures the interference power using symbols despread by a prescribed spreading code, thereby carrying out the transmission power control.

Alternatively, the mobile station can carry out the transmission power control by measuring the interference power I(n) at every pilot symbol period using the following expression.

$$I(n) = \overline{\{x(n) - \overline{x(n)}\}^2} \quad (1)$$

where I(n) is the interference power, and x(n) is the voltage of a symbol of the pilot channels after despreading.

As described above, according to the present invention, the symbol rate of each pilot channel is set higher than the minimum symbol rate of the system. This makes it possible to increase the number of symbols measured in the predetermined time period in the interference measurement, and to improve the accuracy of the transmission power control, thereby increasing the total capacity of the system.

Furthermore, assigning the pilot channel to each orthogonal code set can implement the interference power measurement using the pilot channel belonging to the same orthogonal code set that the current traffic channel belongs to. This can improve the accuracy of the transmission power control, thereby increasing the system capacity.

Moreover, turning off the transmission of the pilot channels of the second and the subsequent orthogonal code set (with reserving the channel without actually transmitting them) can suppress the total downlink transmission power, thereby increasing the system capacity.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes and modifications as fall within the true spirit of the invention.

What is claimed is:

1. A transmission method in a base station for use in a CDMA mobile communication system for transmitting a signal of each of a plurality of channels included in each of a plurality of channel groups, the transmission method comprising the steps of:

spreading the signal of each of the plurality of channels included in each of the plurality of channel groups, by using an orthogonal code, and summing up to combine the signals spread by using the orthogonal code for each of the plurality of channel groups, so that sets of the signals spread by using the orthogonal code are generated, each of the sets corresponding to each of the plurality of channel groups;

spreading each of the sets of the signals spread by using the orthogonal code, by using a spreading code;

summing up to combine each of the sets of the signals spread by using the orthogonal code and the spreading code; and transmitting the sets of the signals which are summed up to combine, wherein the spreading codes differ from each other, the orthogonal codes differ from each other, channels of each channel group include a pilot channel, the pilot channel is spread by using the orthogonal code and the spreading code, and a signal transmitted over the pilot channel undergoes data modulation by a known pattern or does not undergo any data modulation.

2. A transmission method in a base station for use in a CDMA mobile communication system for transmitting a signal of each of a plurality of channels included in each of a plurality of channel groups, the transmission method comprising the steps of:

spreading the signal of each of the plurality of channels included in each of the plurality of channel groups, by using an orthogonal code, and summing up to combine the signals spread by using the orthogonal code for each of the plurality of channel groups, so that sets of the signals spread by using the orthogonal code are generated, each of the sets corresponding to each of the plurality of channel groups;

spreading each of the sets of the signals spread by using the orthogonal code, by using a spreading code;

summing up to combine each of the sets of the signals spread by using the orthogonal code and the spreading code; and transmitting the sets of the signals which are summed up to combine, wherein the spreading codes differ from each other, the orthogonal codes differ from each other, channels of each channel group include a pilot channel, the pilot channel is spread by using the orthogonal code and the spreading code, the step of transmitting transmits a signal of the pilot channel with a symbol rate higher than a minimum symbol rate defined in the CDMA mobile communication system, and the signal transmitted over the pilot channel undergoes data modulation by a known pattern or does not undergo any data modulation.

3. The transmission method as claimed in claim 2, wherein the symbol rate higher than the minimum symbol rate is determined in accordance with a relationship with transmission power of each channel and channel capacity.

4. A communication method for use in a CDMA mobile communication system comprising a base station for transmitting a signal of each of a plurality of channels included in each of a plurality of channel groups, and a mobile station for receiving the signal, the communication method comprising the steps of:

spreading, in the base station, the signal of each of the plurality of channels included in each of the plurality of channel groups, by using an orthogonal code, and summing up to combine the signals spread by using the orthogonal code for each of the plurality of channel groups, so that sets of the signals spread by using the orthogonal code are generated, each of the sets corresponding to each of the plurality of channel groups;

spreading, in the base station, each of the sets of the signals spread by using the orthogonal code, by using a spreading code;

summing up to combine, in the base station, each of the sets of the signals spread by using the orthogonal code and the spreading code;

transmitting, in the base station, the sets of the signals which are summed up to combine;

receiving, in the mobile station, signals including signals of the plurality of channels of the plurality of channel groups which are included in the set of the signals which are summed up to combine; and measuring, in the mobile station, in each channel group, interference power of a channel other than a pilot channel by despreading the received signals by using a orthogonal code and a spreading code for use in spreading a signal of the pilot channel of the channel group, wherein the spreading codes differ from each other, the orthogonal codes differ from each other, channels of each channel group include a pilot channel, the pilot channel is spread by using an orthogonal code and a spreading code, a signal transmitted over the pilot channel undergoes data modulation by a known pattern or does not undergo any data modulation, and the step of transmitting transmits a signal of a pilot channel only in one of the channel groups, and does not transmit a signal of a pilot channel in another channel group.

5. A base station for use in a CDMA mobile communication system for transmitting a signal of each of a plurality of channels included in each of a plurality of channel groups, the base station comprising:

means for spreading the signal of each of the plurality of channels included in each of the plurality of channel groups, by using an orthogonal code, and summing up to combine the signals spread by using the orthogonal code for each of the plurality of channel groups, so that sets of the signals spread by using the orthogonal code are generated, each of the sets corresponding to each of the plurality of channel groups;

means for spreading each of the sets of the signals spread by using the orthogonal code, by using a spreading code;

means for summing up to combine each of the sets of the signals spread by using the orthogonal code and the spreading code; and means for transmitting the sets of the signals which are summed up to combine, wherein the spreading codes differ from each other, the orthogonal codes differ from each other, channels of each channel group include a pilot channel, the pilot channel is spread by using the orthogonal code and the spreading code, and a signal transmitted over the pilot channel undergoes data modulation by a known pattern or does not undergo any data modulation.

6. A CDMA mobile communication system comprising the base station as claimed in claim 5.

7. A base station for use in a CDMA mobile communication system for transmitting a signal of each of a plurality of channels included in each of a plurality of channel groups, the base station comprising:

means for spreading the signal of each of the plurality of channels included in each of the plurality of channel groups, by using an orthogonal code, and summing up to combine the signals spread by using the orthogonal code for each of the plurality of channel groups, so that sets of the signals spread by using the orthogonal code are generated, each of the sets corresponding to each of the plurality of channel groups;

means for spreading each of the sets of the signals spread by using the orthogonal code, by using a spreading code;

means for summing up to combine each of the sets of the signals spread by using the orthogonal code and the spreading code; and means for transmitting the sets of the signals which are summed up to combine, wherein the spreading codes differ from each other, the orthogonal codes differ from each other, channels of each channel group include a pilot channel, the pilot channel is spread by using the orthogonal code and the spreading code, the means for transmitting transmits a signal of the pilot channel with a symbol rate higher than a minimum symbol rate defined in the CDMA mobile communication system, and the signal transmitted over the pilot channel undergoes data modulation by a known pattern or does not undergo any data modulation.

8. The base station as claimed in claim 7, wherein the symbol rate higher than the minimum symbol rate is determined in accordance with a relationship between transmission power of each channel and channel capacity.

9. A CDMA mobile communication system comprising the base station as claimed in claim 7.

10. A CDMA mobile communication system comprising a base station for transmitting a signal of each of a plurality of channels included in each of a plurality of channel groups, and a mobile station for receiving the signal, wherein the base station comprises:

means for spreading the signal of each of the plurality of channels included in each of the plurality of channel groups, by using an orthogonal code, and summing up to combine the signals spread by using the orthogonal code for each of the plurality of channel groups, so that sets of the signals spread by using the orthogonal code are generated, each of the sets corresponding to each of the plurality of channel groups;

means for spreading each of the sets of the signals spread by using the orthogonal code, by using a spreading code;

means for summing up to combine each of the sets of the signals spread by using the orthogonal code and the spreading code; and means for transmitting the sets of the signals which are summed up to combine, and the mobile station comprises:

means for receiving signals including signals of the plurality of channels of the plurality of channel groups which are included in the set of the signals which are summed up to combine; and means for measuring, in each channel group, interference power of a channel other than a pilot channel by despreading the received signals by using an orthogonal code and a spreading code for use in spreading a signal of the pilot channel of the channel group, wherein the spreading codes differ from each other, the orthogonal codes differ from each other, channels of each channel group include a pilot channel, the pilot channel is spread by using an orthogonal code and a spreading code, a signal transmitted over the pilot channel undergoes data modulation by a known pattern or does not undergo any data modulation, and the means for transmitting transmits a signal of a pilot channel only in one of the channel groups, and does not transmit a signal of a pilot channel in another channel group.

11. A mobile station for use in a CDMA mobile communication system for receiving a signal of each of a plurality of channels included in each of a plurality of channel groups, the signal of each of the plurality of channels included in each of the plurality of channel groups being spread by using an orthogonal code, and the signals spread by using the orthogonal code being summed up to combine for each of the plurality of channel groups, so that sets of the signals spread by using the orthogonal code are generated, each of the sets corresponding to each of the plurality of channel groups, each of the sets of the signals spread by using the orthogonal code being spread by using a spreading code, each of the sets of the signals spread by using the orthogonal code and the spreading code being summed up to combine, the spreading codes differing from each other, the orthogonal codes differing from each other, channels of each channel group including a pilot channel, the pilot channel being spread by using an orthogonal code and a spreading code, the mobile station comprising:

means for receiving signals including signals of the plurality of channels of the plurality of channel groups which are included in the set of the signals which are summed up to combine; and means for measuring, in each channel group, interference power of a channel other than a pilot channel by despreading the received signals by using an orthogonal code and a spreading code for use in spreading a signal of the pilot channel of the channel group, wherein a signal transmitted over the pilot channel undergoes data modulation by a known pattern or does not undergo any data modulation.

12. The mobile station as claimed in claim 11, wherein the means for measuring interference power measures the interference power by using a symbol period of the pilot channel.

* * * * *

UNITED STATES PATENT AND TRADEMARK OFFICE
CERTIFICATE OF CORRECTION

PATENT NO. : 7,218,617 B1 Page 1 of 1
APPLICATION NO. : 09/693377
DATED : May 15, 2007
INVENTOR(S) : Usuda et al.

It is certified that error appears in the above-identified patent and that said Letters Patent is hereby corrected as shown below:

Column 1
Line 25, change "cells each" to --each cell--
Line 28, change "the cells each" to --each cell--

Signed and Sealed this

Twentieth Day of May, 2008

JON W. DUDAS
*Director of the United States Patent and Trademark Office*